US012728513B2

(12) United States Patent
Groves et al.

(10) Patent No.: US 12,728,513 B2
(45) **Date of Patent: *Sep. 8, 2026**

(54) LINERBOLT REMOVAL TOOL IMPROVEMENTS

(71) Applicant: Russell Mineral Equipment Pty Ltd., Toowoomba (AU)

(72) Inventors: David Groves, Toowoomba (AU); Peter John Rubie, Toowoomba (AU)

(73) Assignee: Russell Mineral Equipment Pty Ltd., Toowoomba (AU)

(*) Notice: Subject to any disclaimer, the term of this patent is extended or adjusted under 35 U.S.C. 154(b) by 0 days.

This patent is subject to a terminal disclaimer.

(21) Appl. No.: 19/044,011

(22) Filed: Feb. 3, 2025

(65) Prior Publication Data

US 2025/0178174 A1 Jun. 5, 2025

Related U.S. Application Data

(63) Continuation of application No. 18/282,447, filed as application No. PCT/AU2022/050218 on Mar. 15, 2022, now Pat. No. 12,251,811.

(30) Foreign Application Priority Data

Mar. 15, 2021 (AU) ................................ 2021900745

(51) Int. Cl.
*B25D 17/06* (2006.01)
*B25D 9/08* (2006.01)

(52) U.S. Cl.
CPC ............... *B25D 17/06* (2013.01); *B25D 9/08* (2013.01); *B25D 2217/0023* (2013.01)

(58) Field of Classification Search
CPC .. B25D 17/06; B25D 9/08; B25D 2217/0023; B25D 9/145; B25F 5/00; B23P 19/06
(Continued)

(56) References Cited

U.S. PATENT DOCUMENTS 839,297 A * 12/1906 Kennedy et al. ... F16L 37/0841 285/317
1,818,819 A * 8/1931 Seresun ................. H01R 13/20 439/372

(Continued)

FOREIGN PATENT DOCUMENTS

WO WO-9726116 A1 * 7/1997 ............. B25D 9/145

*Primary Examiner* — Robert F Long
(74) *Attorney, Agent, or Firm* — McCarter & English, LLP

(57) ABSTRACT

A linerbolt removal tool, including: a housing; a moil supported for reciprocating movement by the housing; an inertial body located within the housing; a gas charged accumulator extending from the inertial body away from the moil; a piston moveable within the inertial body between a striking position at which the piston strikes the moil and a retracted position, whereby firing the piston from its retracted position to its striking position includes causing pressurized gas within the accumulator to accelerate the piston toward the moil, wherein the piston has a striking end for striking the moil and an opposing rear end; and a piston cap that encloses the rear end of the piston, wherein during firing, the piston and the piston cap initially accelerate together and prior to the piston reaching its striking position the piston cap separates from the piston, whereby the piston cap isolates the piston from the accumulator.

20 Claims, 7 Drawing Sheets

(58) Field of Classification Search
USPC ........ 173/81, 90, 140–141, 162.1, 197, 198, 173/200, 213, 168–171; 227/1–2, 8–19, 227/51, 63–64, 77–82, 99, 107–156
See application file for complete search history.

(56) References Cited

U.S. PATENT DOCUMENTS 3,643,988 A * 2/1972 Ingvartsen ............. B65D 19/12 403/287
4,550,967 A * 11/1985 Riches ............... H01R 13/6278 439/345
4,648,609 A * 3/1987 Deike .................. B25D 17/082 267/155
5,408,768 A * 4/1995 Karani .................... E02F 9/221 172/776
5,485,887 A * 1/1996 Mandanis .............. B25D 17/06 173/91
5,813,313 A * 9/1998 Stoll ................... F15B 15/2807 92/244
2002/0150488 A1* 10/2002 Lee ....................... F04B 39/102 417/569
2004/0140113 A1* 7/2004 Rubie ..................... B25B 27/02 173/206
2007/0251710 A1* 11/2007 Lim .......................... E21B 4/14 173/109
2011/0198381 A1* 8/2011 McCardle ................. B25C 1/06 227/8
2012/0242049 A1* 9/2012 Valler ..................... B25B 27/18 279/128
2013/0042455 A1* 2/2013 Coray ..................... B25B 27/02 411/500
2013/0082083 A1* 4/2013 Largo ...................... B25C 1/041 227/8
2014/0262407 A1* 9/2014 Moore ..................... B25D 9/04 173/208
2023/0122029 A1* 4/2023 Bierdeman ............. B25C 1/047 227/130
2024/0139922 A1* 5/2024 Kawamata ................ B25C 1/04

* cited by examiner

LINERBOLT REMOVAL TOOL IMPROVEMENTS

CROSS-REFERENCE TO RELATED APPLICATIONS

The present application is a continuation application that claims priority to a co-pending national stage filing that was filed on Sep. 15, 2023, and assigned Ser. No. 18/282,447. The foregoing national stage filing was based on and claimed priority to International Application No. PCT/AU2022/050218, filed on Mar. 15, 2022, which application claimed priority benefit to Australian Patent Application No. 2021900745, which was filed Mar. 15, 2021. The content of the foregoing applications are incorporated herein by reference.

BACKGROUND OF THE INVENTION

The present invention relates to improvements to linerbolt removal tools that are used for removing linerbolts for securing liners to mill casings.

DESCRIPTION OF THE PRIOR ART

Linerbolts are typically used to secure sacrificial liners to the internal casing of mills used in the mining industry. The sacrificial liners are routinely replaced during maintenance of the mills. Typically such mills may range in size from three meters to eleven meters in diameter and are lined with replaceable heavy steel segments attached internally to the mill casing by through bolting using linerbolts. The linerbolts typically have a diameter of up to about 50 mm.

In such applications, the bolts become corroded and clearances between bolts and holes become compacted with ore fines. This results in difficult bolt removal at liner removal time. As a result the many linerbolts that are utilized to attach the liners to the mill shell are often required to be freed manually, traditionally by the use of large sledgehammers. This is a difficult and time-consuming task that may result in injury to the workers.

While it is well known to use percussive devices such as jack-hammers and hydraulically powered hammers to provide repetitive impacts for many applications, they are not able to be manually guided into alignment with wall mounted bolts and other components. The applications of jack hammers are limited as the hammering effect produced by an electrically or pneumatically operated jack hammer does not provide the impact as would be provided by a sledge hammer, for example.

In traditional hammering devices capable of delivering such impacts, a high reaction force is produced which necessitates that such devices be carried by articulating machines or be rigidly attached to some support structure. This reduces their versatility and makes them unsuitable for many applications. Furthermore, it is difficult to quickly and accurately align such devices with the shank of a bolt or the like for effecting ready removal thereof.

International Patent Application Publication No. WO1997026116 describes a hydraulic linerbolt removal tool. The hydraulic tool essentially comprises a housing having a moil mounted at the forward end and a hydraulic piston assembly reciprocally moveable along the hammer axis between a striking position at which the piston assembly strikes the impact delivery member and a retracted position remote from the impact delivery member. A firing means, such as a gas-charged accumulator, is provided for firing the piston assembly from its retracted position to its striking position under the control of actuating means, such as a hydraulic ram assembly. A reactive body assembly is moveable in the direction of the hammer axis by driving means towards the impact delivery member prior to operation of the firing means whereby the reactive body assembly may be energized by movement and subsequently decelerated to substantially absorb the reaction generated by firing the piston assembly. Recoil is thus reduced whereby the apparatus may be operated by hand with the apparatus being suspended about its center of gravity at the work site.

International Patent Application Publication No, WO2002081152 describes a pneumatic linerbolt removal tool that is operable from a conventional compressed air supply. The pneumatic linerbolt removing tool includes a moil supported for reciprocal movement along a hammer axis within a housing, an inertial body movably mounted along said hammer axis, and a piston assembly moveable within said inertial body along the hammer axis between a striking position at which it strikes the moil and a retracted position remote therefrom. The tool further includes a gas-charged accumulator for urging said piston toward the moil and air supply means to a cylinder adapted to urge a biasing piston on the inertial body relative to the housing and toward said moil. The inertial body is ported so that working air is supplied to a front face of the piston assembly to urge it to a cocked position away from the moil and whereby the accumulator is in its compressed state. The tool also includes selectively operable porting means for equalizing pressure between the front and rear faces of the piston, to continuously allow transfer of air between said faces while in operation.

Both of the above mentioned publications describe examples of linerbolt removal tools including moils for transferring the force imparted from the piston to the linerbolt during a firing stroke of the piston assembly. Moils for such purposes have traditionally been constructed as rigid components which are supported in a receptacle in a forward end of the tool. The moil and the receptacle may each include corresponding features configured to interact to retain the moil in the receptacle and limit the movement of the moil in use.

One problem that may be encountered in the use of these types of conventional linerbolt removal tools is the shock loading that can be encountered in a so-called "dry-fire" scenario, in which the moil does not actually strike a linerbolt or the linerbolt is easily removed whilst offering little resistance to the impact from the moil. In these scenarios, the forward movement of the moil may be stopped using movement limiting features as discussed above, but this will involve a sudden deceleration and associated transfer of kinetic energy from the moil into the tool structure. This can result in extreme shock loading which can compromise the useful life of the linerbolt removal tool. The moil may also rebound and move in the rearward direction such that it impacts the piston and causes the piston to move in the rearward direction, in a rebound stoke.

Current linerbolt removal tools retain the moil in the receptacle using cross pins. These cross pins have two purposes, the first is to prevent the moil from being ejected from the hammer in the event of a dry fire. Secondly the cross pins prevent the moil from striking the internals of the hammer in the event of a recoil blow. These scenarios induce high magnitude shock waves through the linerbolt removal tool and all critical components, potentially causing failure.

Conventional cross pins are horizontally orientated and are normally retained with lynch pins, which are susceptible to failure.

Both of the above mentioned publications also describe examples of linerbolt removal tools including arrangements for isolating the piston from pressurized gas in the accumulator before it strikes the moil. This traditionally involves mounting a piston cap on the rear of the piston, where the piston cap includes a seal for preventing gas from entering the volume between the piston and the piston cap. The conventional piston cap design includes a cylindrical sleeve portion which bouses the seal and has a sliding fit around the cylindrical rear end of the piston, and a rear cap portion having a flat internal rear face that mates with a corresponding flat rear face of the piston. However, this conventional piston cap design has been found to be a problematic point of failure in current linerbolt removal tools.

During a firing stroke, the piston cap and the piston both accelerate towards the moil, but before the piston strikes the moil, further forward motion of the piston cap is prevented when a front face of the cylindrical sleeve of the piston cap impacts with a collar or the like, while the piston continues its forward motion such that a vacuum is drawn between the piston cap and the piston. This prevents further acceleration of the piston by the pressurized gas in the accumulator. However, during a rebound stroke, the piston moves in a rearward direction and the flat internal rear face of the piston impacts with the flat internal face of the piston cap, causing high stresses in the piston cap. The stresses induced in the piston cap are very different for these two scenarios. The combination of the opposite stresses causes a higher stress range in the piston cap which leads to piston cap failure due to fatigue.

Providing the seal in the piston cap has also been found to be problematic, as it causes the cylindrical portion of the piston cap to be bulky which increases the total piston cap weight and also increases stress concentrations within the piston cap. In addition, the rear end of the piston and the internal rear face of the piston cap are both flat with radius edges due to these faces impacting each other, which leads to failure of piston caps due to high stresses around the internal radius.

Although the volume formed during the separation of the piston and piston cap is sealed so that a vacuum forms during the piston firing stroke, the seal may leak over time and accumulator pressure may enter this volume causing the piston cap to not seat correctly. Eventually the piston cap may fully separate from the piston. To prevent this from happening a fixed buffer rod is traditionally provided inside the accumulator to re-seat the piston cap on the piston. However, the variation of pressure inside this volume can cause inconsistent performance and increased recoil of the hammer. Furthermore, the force of the buffer rod striking the center of the piston cap can lead to failure of the piston cap.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavor to which this specification relates.

SUMMARY OF THE PRESENT INVENTION

In one broad form an aspect of the present invention seeks to provide a linerbolt removal tool, including: a housing; a moil supported for reciprocating movement along a hammer axis by the housing; an inertial body located within the housing; a gas charged accumulator extending from the inertial body in a rearward direction away from the moil; a piston moveable within the inertial body along the hammer axis between a striking position at which the piston strikes the moil and a retracted position remote from the moil at which a rear portion of the piston is retracted within the accumulator, whereby firing the piston from its retracted position to its striking position includes causing pressurized gas within the accumulator to accelerate the piston in a forward direction toward the moil, wherein the piston has a striking end for striking the moil and an opposing rear end; and a piston cap that encloses the rear end of the piston, wherein during firing, the piston and the piston cap initially accelerate together and prior to the piston reaching its striking position the piston cap separates from the piston which continues to move in the forward direction until the striking end of the piston strikes the moil, whereby the piston cap isolates the piston from the accumulator, and wherein: a front portion of the piston cap impacts on an impact surface inside the accumulator to cause the piston cap to separate from the piston; and the piston includes a ledge proximate to the rear end of the piston that impacts on the front portion of the piston cap when the piston moves in the rearward direction from the striking position towards the retracted position.

In one embodiment, the front portion of the piston cap includes a single cap impact face for impacting with each of the impact surface and the ledge.

In one embodiment, an outer region of the cap impact face impacts with the impact surface and an inner region of the cap impact face impacts with the ledge.

In one embodiment, the cap impact face has an annular shape with an internal diameter that is less than a diameter of the ledge and an external diameter that is greater than the diameter of the ledge.

In one embodiment, the front portion of the piston cap includes a first cap impact face for impacting with the impact surface and a second cap impact face for impacting with the ledge.

In one embodiment, the first cap impact face has an annular shape that corresponds to the impact surface and the second cap impact face has an annular shape that corresponds to the ledge.

In one embodiment, the first cap impact face is offset rearwardly from the second cap impact face.

In one embodiment, the front portion of the piston cap has a flared profile such that it is thicker proximate to the cap impact face(s).

In one embodiment, the piston includes a relief groove inwardly of the ledge.

In one embodiment, the linerbolt removal tool includes an impact collar mounted between the inertial body and the accumulator, wherein the piston slides inside the impact collar and the impact surface is provided on a rear edge of the impact collar.

In one embodiment, the impact collar is tapered such that a diameter of the impact collar reduces to a minimum diameter at the rear edge of the impact collar.

In one embodiment: a rear portion of the piston cap bas a concavely curved internal cap surface; and the rear end of the piston has a convexly curved piston surface that substantially conforms to the concavely curved internal cap surface.

In another broad form an aspect of the present invention seeks to provide a linerbolt removal tool, including: a housing; a moil supported for reciprocating movement along a hammer axis by the housing; an inertial body located within the housing; a gas charged accumulator extending from the inertial body in a rearward direction away from the moil; a piston moveable within the inertial body along the hammer axis between a striking position at which the piston strikes the moil and a retracted position remote from the moil at which a rear portion of the piston is retracted within the accumulator, whereby firing the piston from its retracted position to its striking position includes causing pressurized gas within the accumulator to accelerate the piston in a forward direction toward the moil, wherein the piston has a striking end for striking the moil and an opposing rear end; and a piston cap that encloses the rear end of the piston, wherein during firing, the piston and the piston cap initially accelerate together and prior to the piston reaching its striking position the piston cap separates from the piston which continues to move in the forward direction until the striking end of the piston strikes the moil, whereby the piston cap isolates the piston from the accumulator, and wherein: a rear portion of the piston cap has a concavely curved internal surface; and the rear end of the piston has a convexly curved surface that substantially conforms to the concavely curved internal cap surface.

In one embodiment, the concavely curved internal cap surface has a substantially parabolic profile.

In one embodiment, the rear portion of the piston cap has a convexly curved external cap surface.

In one embodiment, the convexly curved external cap surface has a substantially parabolic profile.

In one embodiment, the concavely curved internal cap surface and the convexly curved external cap surface have different curvatures.

In one embodiment, piston cap has a thin walled construction.

In one embodiment, a thickness of the piston cap varies between the front portion and the rear portion.

In one embodiment, the piston cap includes a substantially cylindrical portion extending between the front portion and the rear portion.

In one embodiment, the rear end of the piston includes a flat rear face rearwardly of the convexly curved piston surface, such that a void is defined between the flat rear face and part of the concavely curved internal cap surface.

In one embodiment, the piston cap is constructed from steel.

In one embodiment: the piston cap includes an internal cylindrical surface; and the piston includes a seal that sealingly engages with the internal cylindrical surface of the piston cap such that gas is not permitted to flow between the accumulator and a volume that forms between the piston cap and a rear end of the piston when the piston cap separates from the rear end of the piston.

In another broad form an aspect of the present invention seeks to provide a linerbolt removal tool, including; a housing; a moil supported for reciprocating movement along a hammer axis by the housing; an inertial body located within the housing; a gas charged accumulator extending from the inertial body in a rearward direction away from the moil; a piston moveable within the inertial body along the hammer axis between a striking position at which the piston strikes the moil and a retracted position remote from the moil at which a rear portion of the piston is retracted within the accumulator, whereby firing the piston from its retracted position to its striking position includes causing pressurized gas within the accumulator to accelerate the piston in a forward direction toward the moil, wherein the piston has a striking end for striking the moil and an opposing rear end; and a piston cap that encloses the rear end of the piston, wherein during firing, the piston and the piston cap initially accelerate together and prior to the piston reaching its striking position the piston cap separates from the piston which continues to move in the forward direction until the striking end of the piston strikes the moil, whereby the piston cap isolates the piston from the accumulator, and wherein: the piston cap includes an internal cylindrical surface; and the piston includes a seal that sealingly engages with the internal cylindrical surface of the piston cap such that gas is not permitted to flow between the accumulator and a volume that forms between the piston cap and a rear end of the piston when the piston cap separates from the rear end of the piston.

In one embodiment, the seal is provided in the piston proximate to the rear end of the piston.

In one embodiment, the seal is embedded in a cylindrical outer surface of the piston.

In one embodiment, the seal is a pressure seal embedded in a groove inscribed around a circumference of the piston.

In one embodiment, the piston cap includes a thin walled cylindrical portion having the internal cylindrical surface.

In one embodiment, the linerbolt removal tool includes a seal between the piston and the piston cap such that gas is not permitted to flow between the accumulator and a volume that forms between the piston cap and a rear end of the piston when the piston cap separates from the rear end of the piston body.

In one embodiment, the piston includes a hole extending from its striking end to its rear end for permitting gas communication between the atmosphere surrounding the striking end and the volume between the piston cap and the rear end of the piston.

In another broad form an aspect of the present invention seeks to provide a linerbolt removal tool, including: a housing; a moil supported for reciprocating movement along a hammer axis by the housing; an inertial body located within the housing; a gas charged accumulator extending from the inertial body in a rearward direction away from the moil; a piston moveable within the inertial body along the hammer axis between a striking position at which the piston strikes the moil and a retracted position remote from the moil at which a rear portion of the piston is retracted within the accumulator, whereby firing the piston from its retracted position to its striking position includes causing pressurized gas within the accumulator to accelerate the piston in a forward direction toward the moil, wherein the piston has a striking end for striking the moil and an opposing rear end; and a piston cap that encloses the rear end of the piston, wherein during firing, the piston and the piston cap initially accelerate together and prior to the piston reaching its striking position the piston cap separates from the piston which continues to move in the forward direction until the striking end of the piston strikes the moil, whereby the piston cap isolates the piston from the accumulator, and wherein; a seal is provided between the piston and the piston cap such that gas is not permitted to flow between the accumulator and a volume that forms between the piston cap and a rear end of the piston when the piston cap separates from the rear end of the piston body; and the piston includes a hole extending from its striking end to its rear end for permitting gas communication between the atmosphere surrounding the striking end and the volume between the piston cap and the rear end of the piston.

In one embodiment, the hole extends along the hammer axis and is located on a central axis of the piston.

In one embodiment, the hole includes a filter mounted in an enlarged opening at the rear end of the piston.

In one embodiment, the linerbolt removal tool includes a buffer rod inside the accumulator for urging the piston cap onto the rear end of the piston when the piston moves to the retracted position.

In one embodiment, the moil is supported by a receptacle in the housing and the linerbolt removal tool includes cross pins extending across the receptacle for limiting movement of the moil, wherein when the moil impacts a linerbolt that is unable to absorb the striking energy imparted to the moil, forward movement of the moil is stopped by the cross pins, and wherein the cross pins are mounted in bushes formed from a resilient material.

In another broad form an aspect of the present invention seeks to provide a linerbolt removal tool, including: a housing; a moil supported for reciprocating movement along a hammer axis by a receptacle in the housing; an inertial body located within the housing; a gas charged accumulator extending from the inertial body in a rearward direction away from the moil; a piston moveable within the inertial body along the hammer axis between a striking position at which the piston strikes the moil and a retracted position remote from the moil at which a rear portion of the piston is retracted within the accumulator, whereby firing the piston from its retracted position to its striking position includes causing pressurized gas within the accumulator to accelerate the piston in a forward direction toward the moil, and cross pins extending across the receptacle for limiting movement of the moil, wherein when the moil impacts a linerbolt that is unable to absorb the striking energy imparted to the moil, forward movement of the moil is stopped by the cross pins, and wherein the cross pins are mounted in bushes formed from a resilient material.

In one embodiment, the resilient material is an elastomer.

In one embodiment, the cross pins are isolated from the housing using the bushes.

In one embodiment, each cross pin is mounted in a pair of bushes.

In one embodiment, each bush includes a flange that engages with a radial recess groove in the housing for retaining the bush in the housing.

In one embodiment, the cross pins and bushes are oriented vertically.

In one embodiment, each cross pin includes a step at a bottom end thereof which engages with a corresponding shoulder in a respective lower one of the bushes to thereby restrain the cross pin within the bush.

In one embodiment, the moil includes: at least one supporting surface for supporting the moil within the receptacle; and at least one engaging surface for engaging with the cross pins, wherein the engaging surface is recessed relative to the at least one supporting surface.

In one embodiment: the at least one supporting surface is substantially cylindrical; and the at least one engaging surface is a groove defined around a circumference of the moil.

In one embodiment, the accumulator is formed as a substantially blind axial cylinder extending from the inertial body.

In one embodiment, the accumulator is charged for firing by hydraulically driving the piston to its retracted position.

In one embodiment, the accumulator is fired by quick release of the hydraulic fluid utilized to drive the piston to its retracted position.

In one embodiment, the quick release is provided by controlling the outflow of the hydraulic fluid utilized to drive the piston to its retracted position through cascade connected logic elements.

In one embodiment, the accumulator is gas charged external of the housing via a suitably valved charging tube to the inertial body including a flexible tube section to accommodate movement of the inertial body.

In one embodiment, the piston slides in a cylinder formed in the inertial body.

In one embodiment, the inertial body is moveable within the housing along the hammer axis, whereby firing the piston from its retracted position to its striking position includes causing pressurized gas within the accumulator to accelerate the piston in the forward direction toward the moil while the inertial body accelerates in the rearward direction.

In one embodiment, the linerbolt removal tool includes a hydraulic ram assembly for moving the inertial body in the forward direction toward the moil prior to firing the piston whereby the inertial body is accelerated in the rearward direction and subsequently decelerated to substantially absorb a reaction generated by firing the piston.

In one embodiment, the hydraulic ram assembly is also for moving the inertial body in the rearward direction away from moil subsequent to firing the piston.

In one embodiment, the hydraulic ram assembly includes a plurality of fluid inlet ports which are sequentially opened to a working chamber of the hydraulic ram assembly as the length of the working chamber extends.

In one embodiment, the hydraulic ram assembly is a double acting ram assembly having a working chamber which converts to a drain chamber upon reverse operation of the hydraulic ram assembly and wherein the plurality of fluid inlet ports become drain ports which are sequentially closed during contraction of the drain chamber.

In one embodiment, the inertial body is constrained to move along one or more guides associated with the housing.

In one embodiment, the inertial body is supported on linear bearings on a pair of spaced parallel bars which extend parallel to the hammer axis.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various examples and embodiments of the present invention will now be described with reference to the accompanying drawings, in which.

DETAILED DESCRIPTION OF THE PREFERRED EMBODIMENTS

Figure 1:
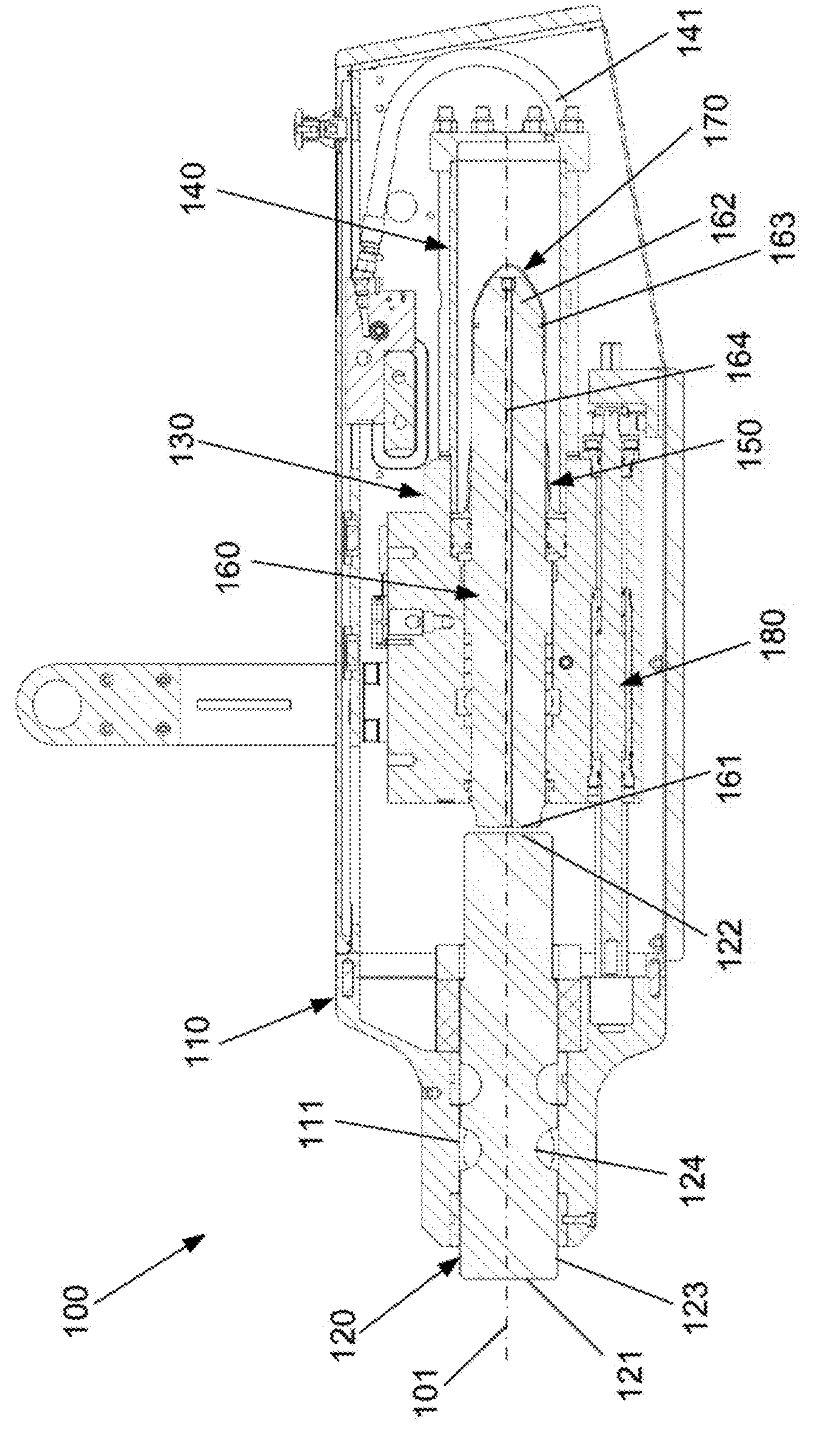
FIG. 1 is a side cross section view of a linerbolt removal tool.

An example of a linerbolt removal tool 100, incorporating a number of improvements compared to conventional linerbolt removal tools as discussed above, will now be described with reference to FIG. 1 showing the overall configuration and the subsequent FIGS. 2A, 2B, 3A and 3B showing details of internal elements of the linerbolt removal tool 100.

In the following example and the further examples to follow, it will be generally assumed, unless otherwise specified herein, that the construction and functionality of the improved embodiments of the linerbolt removal tool 100 may be based on embodiments of the conventional linerbolt removal tools as disclosed in the above discussed International Patent Application Publication Nos. WO1997026116 and WO2002081152, the entire contents of which are incorporated herein by reference. However, it should be appreciated that the improvements described herein may also be implemented into other types of linerbolt removal tools that have different construction and/or functionality compared to the above referenced publications, as long as they are compatible with the particular features of the linerbolt removal tool 100 described herein.

In broad terms, the linerbolt removal tool 100 includes a housing 110; a moil 120 supported for reciprocating movement along a hammer axis 101 by the housing 110; an inertial body 130 located within the housing 110; a gas charged accumulator 140 extending from the inertial body 130 in a rearward direction away from the moil 120; a piston 160 moveable within the inertial body 130 along the hammer axis 101 between a striking position at which the piston 160 strikes the moil 120 and a retracted position remote from the moil 120 at which a rear portion of the piston 160 is retracted within the accumulator 140.

As per conventional linerbolt removal tools as discussed above, firing the piston 160 from its retracted position to its striking position includes causing pressurized gas (such as nitrogen gas) within the accumulator 140 to accelerate the piston 160 in a forward direction toward the moil 120. In some embodiments, the linerbolt removal tool may have a recoilless action, in which the internal body 130 may be moveable within the housing 110 along the hammer axis 101, whereby firing the piston 160 involves causing the pressurized gas within the accumulator 140 to accelerate the piston 160 in a forward direction toward the moil 120 while the inertial body 130 accelerates in the rearward direction. However, it should be appreciated that this recoilless action is not essential and the improvements described herein may be applied to other types of linerbolt removal tools.

The piston 160 has a striking end 161 for striking the moil 120 and an opposing rear end 162. The linerbolt removal tool 100 also includes a piston cap 170 that encloses the rear end 162 of the piston 160, wherein during firing the piston 160 and the piston cap 170 initially accelerate together and prior to the piston 160 reaching its striking position the piston cap 170 separates from the piston 160 which continues to move in the forward direction until the forward end 161 of the piston 160 strikes the moil 120, whereby the piston cap 170 isolates the piston 160 from the accumulator 140.

With reference to the more detailed views of the rear portion of the linerbolt removal tool 100 in FIGS. 2A, 2B, 3A and 3B, a number of improved aspects in relation to the design of the piston cap 170 will now be described.

Figure 2A:
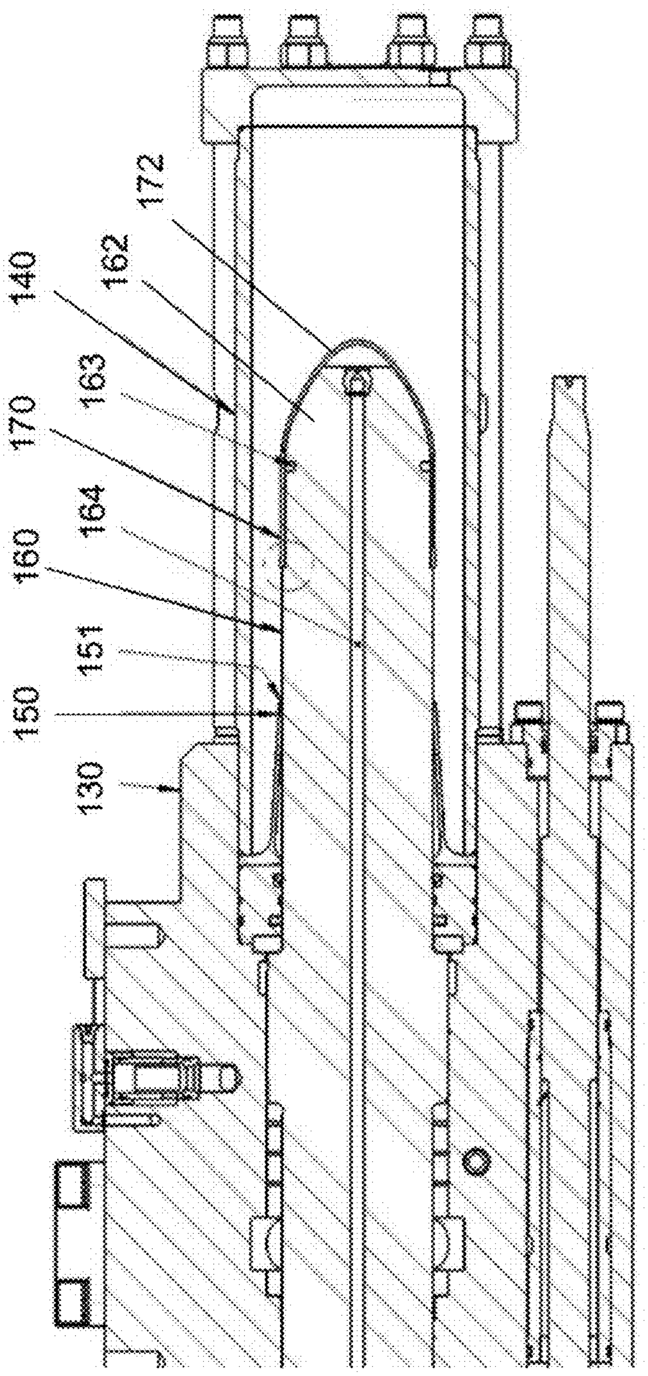
FIG. 2A is a side cross section view of a rear portion of the linerbolt removal tool of FIG. 1, with some elements hidden for clarity, in which a piston of the linerbolt removal tool is in a retracted position.
Figure 2B:
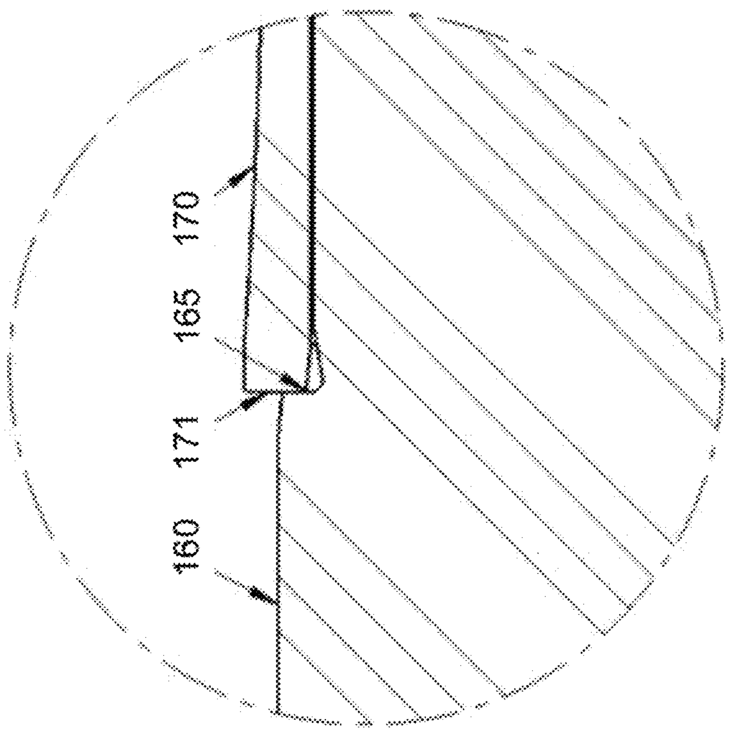
FIG. 2B is a detail cross section view of an interface between the piston and a piston cap of the linerbolt removal tool as shown in FIG. 2A.

In one aspect, embodiments of the linerbolt removal tool 100 may be configured so that a front portion 171 of the piston cap 170 impacts on an impact surface 151 inside the accumulator 140 to cause the piston cap 170 to separate from the piston 160 (as shown in FIG. 2B), and the piston 160 includes a ledge 165 that impacts on the front portion 171 of the piston cap 170 when the piston 160 moves in the rearward direction from the striking position towards the retracted position (as shown in FIG. 2D), for example during a rebound stroke.

This arrangement enables impact loading to be applied to the front portion 171 of the piston cap 170 for both of these scenarios which reduces the overall stress range by allowing the same load conditions for the forward and rebound load cases.

This can be contrasted with conventional piston cap designs, where the piston cap impacts on a front face during the firing stroke and impacts on an inside rear face during a rebound stroke and the stresses induced in the piston cap are very different for these two scenarios. Such conventional piston cap designs are not ideal for these different stress cycles, and as mentioned above, the combination of these opposite stresses cause a higher stress range in the piston cap which leads to cap failure due to fatigue.

However, it will be appreciated that the improved design of the piston cap 170 addresses this problem in the conventional piston cap designs. Since all impacts now take place at front portion 171 of the piston cap 170 (i.e. there are no longer impacts in the rear portion of the cap in dry fire scenarios, etc.), the loads in the rear portion of the piston cap 170 are significantly reduced. Impact loading at the same end of the piston cap 170 for forward/reverse scenarios means the piston cap 170 can be designed with a single stress profile, as opposed to the prior art where the piston cap designs had to account for very different stress profiles due to impacts at either end.

Further operational details of this aspect will now be described.

In the embodiment depicted in the FIGURES, the linerbolt removal tool 100 includes an impact collar 150 mounted between the inertial body 130 and the accumulator 140. The piston 160 slides inside the impact collar 150, and in this embodiment the impact surface 151 is provided on a rear edge of the impact collar 150. It will be appreciated that providing the impact surface 151 on a separate part such as the impact collar 150 will allow the particular configuration of the impact surface 151 to be controlled as part of the design of the impact collar 150 component.

However, it should be appreciated that it is not essential for the impact surface 151 to be provided on an impact collar 150, and in other embodiments the impact surface 151 may be provided as a suitable surface of another component, such as a surface of the inertial body 130 facing the accumulator 140, a surface inside the accumulator proximate the inertial body 130, or a surface of another part generally between the inertial body 130 and the accumulator 140.

FIGS. 2A and 2B show the piston 160 in a fully retracted position prior to the firing sequence. At the start of the firing sequence the front portion 171 of the piston cap 170 is at rest against the ledge 165 of the piston 160. As the firing sequence proceeds the piston 160 and the piston cap 171 are accelerated together in the forward direction by the pressurized gas in the accumulator 140. Prior to the piston 160 impacting the moil 120 the front portion 171 of the piston cap 170 impacts on the impact surface 151 of the impact collar 150. The piston 160 continues travelling forward due to its momentum until it impacts the moil 120.

Figure 3A:
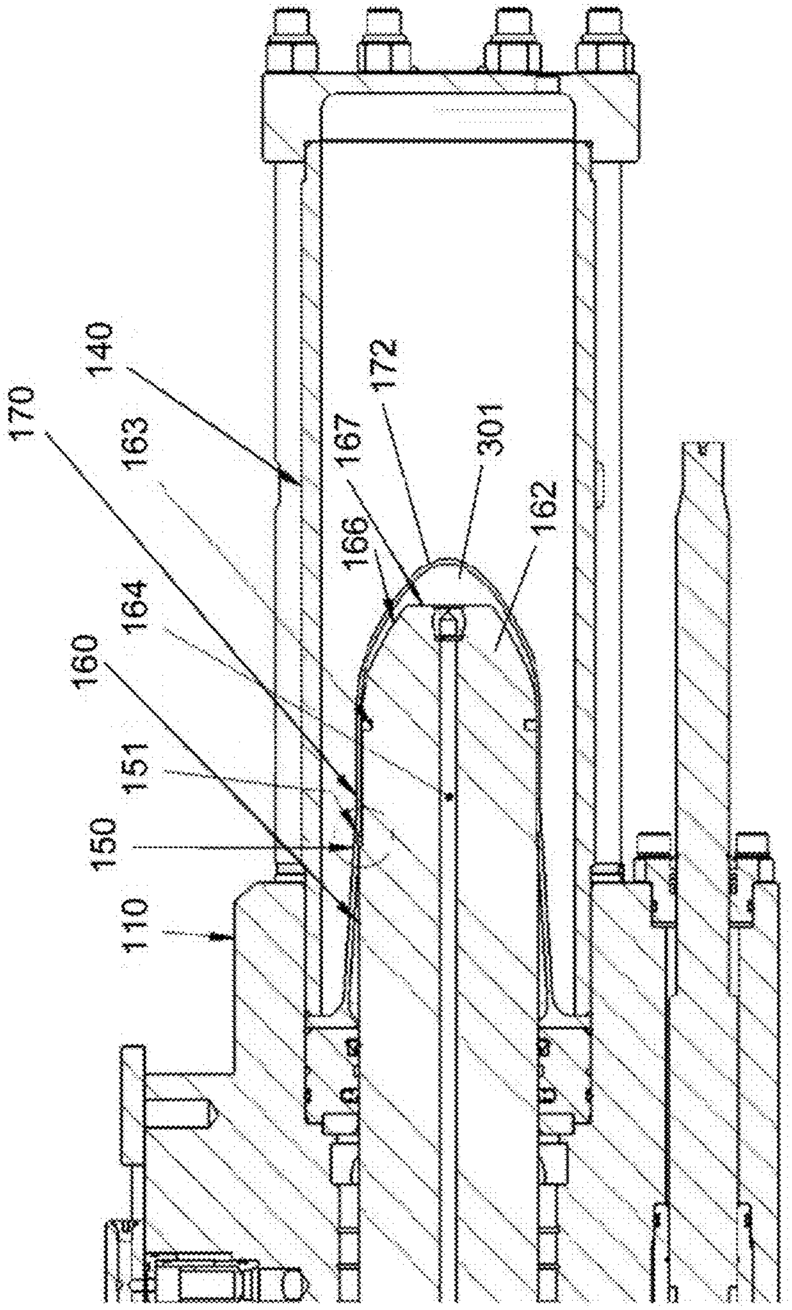
FIG. 3A is a side cross section view of the rear portion of the linerbolt removal tool of FIG. 1, with some elements hidden for clarity, in which the piston is moving from the retracted position towards a striking position during firing.
Figure 3B:
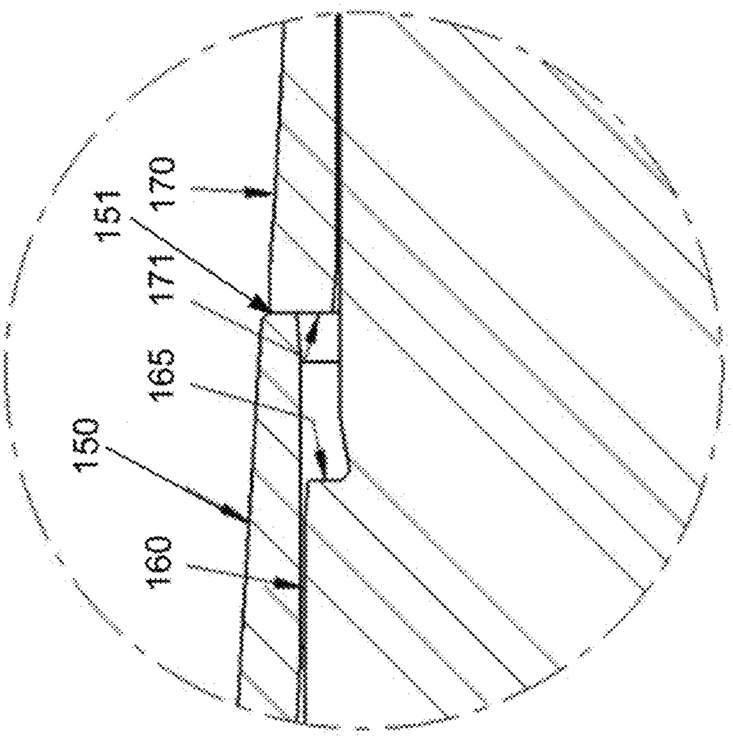
FIG. 3B is a detail cross section view showing an interface between the piston cap and an impact surface of the linerbolt removal tool as shown in FIG. 3A.

FIGS. 3A and 3B show the piston 160 separated from the piston cap 170 due to the front portion 171 of the piston cap 170 being in contact with the impact surface 151 of the impact collar 150. As the piston 160 continues forward the piston cap 170 isolates the rear end 162 of the piston 160 from the gas pressure within the accumulator 140, for example via a seal 163 mounted to the rear of the piston 160. An optional hole 164 through the center of the piston 160 is open to atmosphere at the striking end 161 of the piston and ensures that a volume 301 created by the separation of the piston 160 and the piston cap 170 remains at atmospheric pressure. Further details of this arrangement will be described below.

In some instances where the moil 120 impacts a highly resilient object the moil 120 rebounds causing it to impact the piston 160 and sending it in a rearward direction at velocity. When this occurs the ledge 165 of the piston 160 impacts the front portion 171 of the piston cap 170. The gas pressure in the accumulator 140 acting on the piston cap 170 brings the piston 160 and piston cap 170 to rest.

A number of preferred or optional features of this aspect will now be described.

In some embodiments, the front portion 171 of the piston cap 170 may include a single cap impact face for impacting with each of the impact surface 151 and the ledge 165. In this case, the front portion 171 of the piston cap 170 may be configured so that an outer region of the cap impact face may impact with the impact surface 151 and an inner region of the cap impact face impacts with the ledge 165. In one example, the cap impact face may have an annular shape with an internal diameter that is less than a diameter of the ledge 165 and an external diameter that is greater than the diameter of the ledge 165, However, it is not essential to provide a single cap impact face, and in some alternative embodiments, the front portion 171 of the piston cap 170 may include a first cap impact face for impacting with the impact surface 151 and a second cap impact face for impacting with the ledge 165. In this case, the first cap impact face may have an annular shape that corresponds to the impact surface 151 and the second cap impact face may have an annular shape that corresponds to the ledge 165. In some implementations, the first cap impact face may be offset rearwardly from the second cap impact face.

In some embodiments, the front portion 171 of the piston cap 170 may have a flared profile such that it is thicker proximate to the cap impact face(s), as can be seen in FIGS. 2B and 3B. This can help to ensure that the front portion 171 of the piston cap 170 has adequate strength and stability for withstanding the impact loading.

As shown in FIGS. 2B and 3B, in some implementations the piston 160 may include a relief groove inwardly of the ledge 165. Additionally or alternatively, in some implementations the impact collar 150 may be tapered such that its diameter reduces to a minimum diameter at the rear edge of the impact collar 150, which in this embodiment provides the impact surface 151 that impacts with the front portion 171 of the piston cap 170. However, as mentioned above, the use of an impact collar 150 for providing the impact surface 151 is not essential and the impact surface 151 may be provided on another component of the linerbolt removal tool 100.

In another aspect, embodiments of the linerbolt removal tool 100 may be configured so that a rear portion 172 of the piston cap 170 has a concavely curved internal cap surface, and the rear end 162 of the piston 160 has a convexly curved piston surface 166 that substantially conforms to the concavely curved internal cap surface.

This arrangement can be contrasted with the conventional piston cap and piston designs which typically have respective internal and external faces having squared ends with radius edges due to these faces impacting each other. High stresses around the internal radius can cause failure of piston caps having this conventional design approach.

It will be appreciated that this aspect addresses this problem by providing the piston cap 170 with a profile that greatly reduces stress concentrations. In some examples the profile could be in the form of a parabola. Due to the reduction in stress concentrations this also allows for the profile to have a thin wall, greatly helping the total mass of the piston cap 170. The mass of the piston cap 170 is critical to the hammer performance due to the energy wasted to accelerate the piston cap 170 which does not contribute to the energy imparted by the piston 160 during use of the linerbolt removal tool 100.

A number of preferred or optional features of this other aspect will now be described.

In some examples, the concavely curved internal cap surface may have a substantially parabolic profile, which has been found to be an advantageous profile for optimizing the strength of the piston cap 170 in a rebound stroke scenario.

In some embodiments, the rear portion 172 of the piston cap has a convexly curved external cap surface, which may also have a substantially parabolic profile. In some implementations, the concavely curved internal cap surface and the convexly curved external cap surface have different curvatures, which may be desirable from a strength perspective.

Preferably, the piston cap 170 has a thin walled construction, which can enable significant reduction of the mass of the piston cap 170, although this is not essential. It should be appreciated that such a thin walled construction of the piston cap 170 does not necessarily involve a constant wall thickness, and in fact it can be desirable for the thickness of the piston cap 170 to vary between the front portion 171 and the rear portion 172. As mentioned above, the front portion 171 of the piston cap 170 may have a flared profile, i.e. having increasing thickness in the forward direction. In cases where the internal and external cap surfaces of the rear portion 172 of the piston cap 170 both have a parabolic curved profile, this can result in increased thickness in the rear section of the cap.

As shown in the FIGURES, the piston cap 170 will typically include a substantially cylindrical portion extending between the front portion 171 and the rear portion 172. As will be described in further detail below, this will generally facilitate sealing between the piston 160 and the piston cap 170.

In the particular implementation shown in the FIGURES, the rear end 162 of the piston 160 also includes a flat rear face 167 rearwardly of the convexly curved piston surface 166, such that a void is defined between the flat rear face 167 and part of the concavely curved internal cap surface of the rear portion 172 of the piston cap 170.

In one preferred implementation, the piston cap 170 may be constructed from steel, which can be precision machined to provide a thin walled, light weight component having a specific desired profile for ensuring adequate strength. It is noted that conventional piston caps were typically constructed from nylon for reduce weight, since other design constraints traditionally prevented the thin walled construction that is now available in view of the design improvements to the piston cap 170.

In a further aspect, embodiments of the linerbolt removal tool 100 may be configured so that the piston cap 170 includes an internal cylindrical surface, and the piston 160 includes a seal 163 that sealingly engages with the internal cylindrical surface of the piston cap 170 such that gas is not permitted to flow between the accumulator 140 and a volume 301 that forms between the piston cap 170 and a rear end 162 of the piston 160 when the piston cap 170 separates from the rear end 162 of the piston 160.

This can be contrasted with prior art arrangements in which the sealing between the piston cap and the piston is achieved using a seal that is provided inside the piston cap so that the seal runs on the outside of the piston. This traditional design approach caused the designed cross section of the piston cap to be bulky, which increases the total piston cap weight and in turn increases stress concentrations within the piston cap. However, this problem can be avoided by relocating the seal 163 so that it is provided inside the piston 160 instead, with the seal 163 running on the internal cylindrical surface of the piston cap 170.

Simulations of a piston 160 impacting a moil 120 have shown that the stresses are reasonably low proximate to the rear end 162 of the piston 160, and this has allowed the sealing design to change and allowed the seal 163 to be installed on the outside of the piston 160 rather than inside the piston cap 170. This allows the piston cap 170 to have a significantly reduced cross section, reducing the overall mass of the piston cap 170. This has also allowed for more optimal stress flow into the piston cap 170 upon impacts.

Typically, the seal 163 is provided in the piston 160 proximate to the rear end 162 of the piston 160. In some embodiments, the seal 163 is embedded in a cylindrical outer surface of the piston 160. In preferred implementations, the seal 163 is a pressure seal embedded in a groove inscribed around a circumference of the piston. As mentioned above, the piston cap 170 may include a thin walled cylindrical portion (i.e. between the front portion 171 and the rear portion 172), which may provide the internal cylindrical surface along which the seal 163 runs in use.

In another aspect, embodiments of the linerbolt removal tool 100 may be configured so that the piston 160 includes a hole 164 extending from its striking end 161 to its rear end 162 for permitting gas communication between the atmosphere surrounding the striking end 161 and the volume 301 between the piston cap 170 and the rear end of the piston 162.

This ensures that the piston cap 170 always returns to being fully seated on the rear end 162 of the piston 160, without the need for a buffer rod as in prior art linerbolt removal tools. In turn this leads to consistent hammer performance and reduce stress in the piston cap 170, noting that the piston cap 170 will no longer need to be designed to withstand strikes with the buffer rod in a rebound stroke, which has traditionally been a point of failure in conventional piston caps.

It will be understood that this will require sealing between the piston 160 and the piston cap 170. Although this would preferably be achieved using the arrangement described above, wherein the seal 163 is provided in the piston 160, this aspect could also be implemented into any embodiments which include a seal between the piston and the piston cap such that gas is not permitted to flow between the accumulator and a volume that forms between the piston cap and a rear end of the piston when the piston cap separates from the rear end of the piston body, such as in the conventional sealing design seen in the prior art.

Typically, the hole 164 extends along the hammer axis and is located on a central axis of the piston 160. In some examples, the hole 164 may include a filter mounted in an enlarged opening at the rear end 162 of the piston 160, as shown in the FIGURES.

Although the use of a hole 164 in this manner is not an essential element of the other aspects described above, it is highly desirable to provide in combination with the other aspects as it will allow the design of the piston cap 170 to be further optimized by avoiding the need to account for buffer rod loads. If a hole 164 is not provided, the linerbolt removal tool 100 may include a buffer rod (not shown) inside the accumulator 140 for urging the piston cap 170 onto the rear end 162 of the piston 160 when the piston 160 moves to the retracted position.

It should be understood that the above described aspects of the improvements to the linerbolt removal tool 100 may be implemented separately or in any combination. Preferred embodiments may combine all of the different aspects, which has been found to allow the design of the piston cap 170 to be optimized to reduce its likelihood of failure and also reduce its mass which can improve the performance of the linerbolt removal tool by conserving energy that would otherwise be wasted to accelerate the mass of the piston cap 170. However, this is not essential, and substantial benefits may be realized by implementing any one or more of these aspects into embodiments of the linerbolt removal tool 100.

With reference again to FIG. 1 and the detailed views of the front portion of the linerbolt removal tool 100 in FIGS. 4A and 4B, another improved aspect in relation to the retention of the moil 120 in the linerbolt removal tool 100 will now be described.

It should be appreciated that although this aspect may be implemented in embodiments of the linerbolt removal tool 100 incorporating one or more of the above described improvements in the relation to the design of the piston cap 170, this is not essential, and this aspect may be implemented independently without compromising its functionality and associated advantages.

In broad terms, and with regard again to FIG. 1, the linerbolt removal tool 100 in accordance with this aspect includes a housing 110; a moil 120 supported for reciprocating movement along a hammer axis 101 by a receptacle 111 in the housing 110; an inertial body 130 located within the housing 110; a gas charged accumulator 140 extending from the inertial body 130 in a rearward direction away from the moil 120; and a piston 160 moveable within the inertial body 130 along the hammer axis 101 between a striking position at which the piston 160 strikes the moil 120 and a retracted position remote from the moil 120 at which a rear portion of the piston 160 is retracted within the accumulator 140. Firing the piston 160 from its retracted position to its striking position includes causing pressurized gas (such as nitrogen gas) within the accumulator 140 to accelerate the piston 160 in a forward direction toward the moil 120.

Figure 4A:
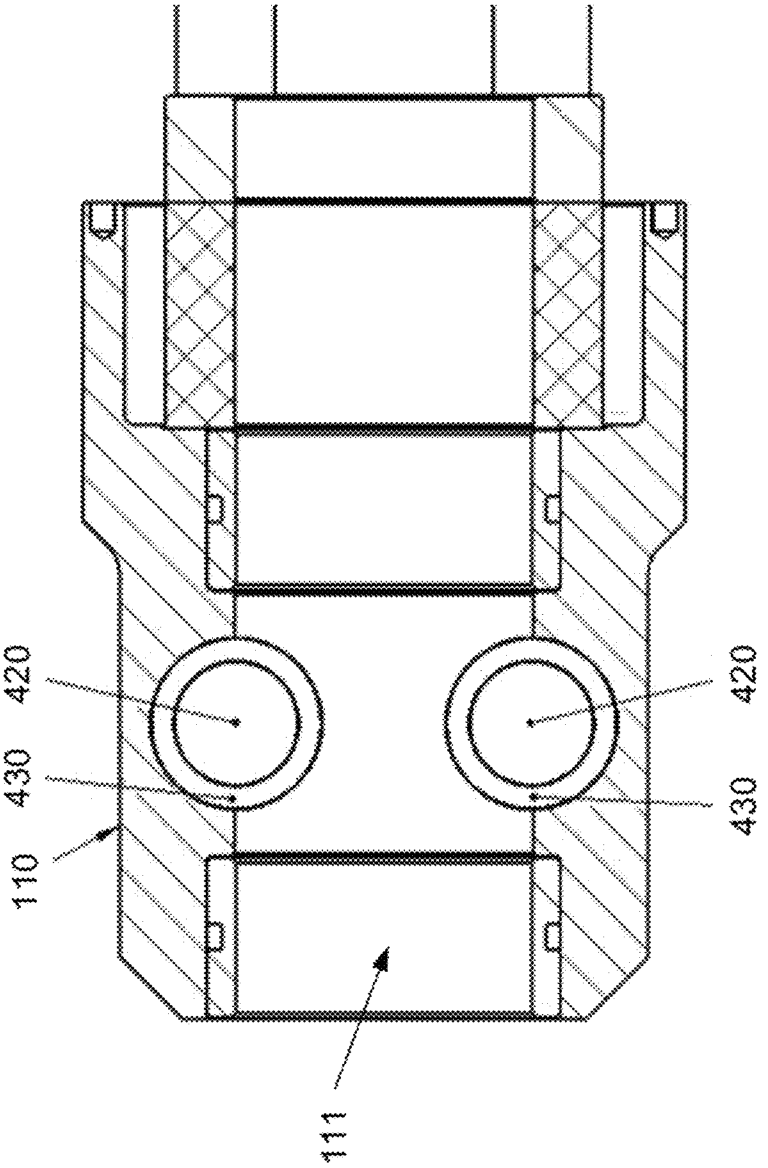
FIG. 4A is a plan cross section view of a front portion of a housing of the linerbolt removal tool of FIG. 1, showing cross pins extending across a receptacle.
Figure 4B:
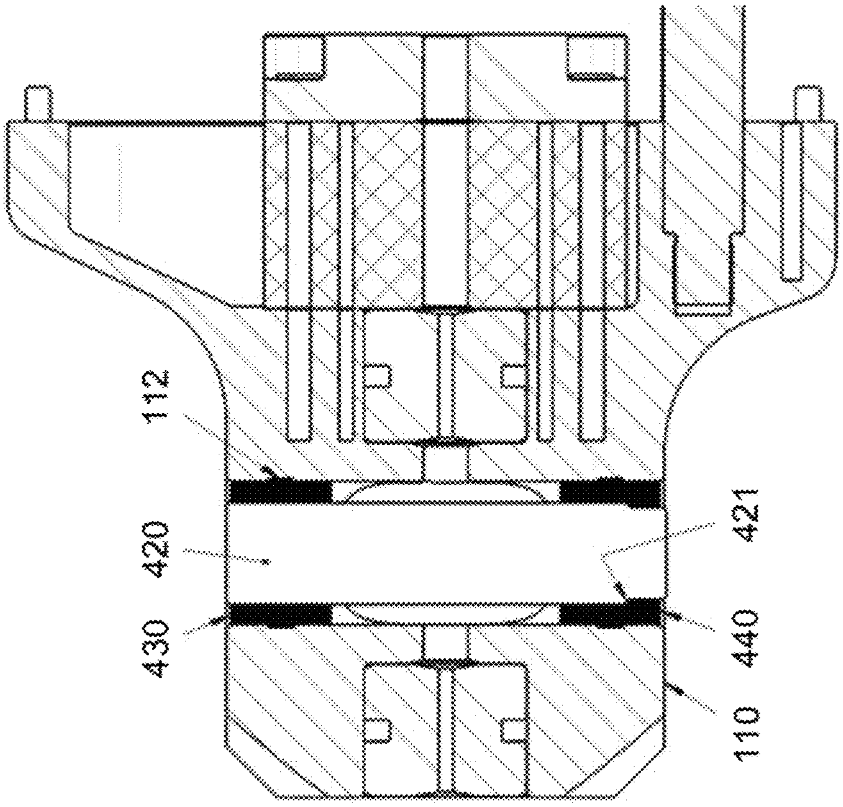
FIG. 4B is a side cross section view of the front end of the housing of the linerbolt removal tool of FIG. 4A, through an axis of one of the cross pins.

In this aspect, and with regard to FIGS. 4A and 4B, the linerbolt removal tool 100 additionally includes cross pins 420 extending across the receptacle 111 for limiting movement of the moil 120 (not shown in FIGS. 4A and 4B, but shown in FIG. 1). When the moil 120 impacts a linerbolt that is unable to absorb the striking energy imparted to the moil 120, forward movement of the moil 120 is stopped by the cross pins 420. The cross pins 420 are specifically mounted in bushes 430, 440, which are formed from a resilient material. Preferably, the resilient material is an elastomer. It will be appreciated that, in this arrangement, the cross pins 420 may be isolated from the housing 110 using the bushes 430, 440.

As per conventional linerbolt removal tools which retain the moil 120 via cross pins, the cross pins 420 have two purposes, the first being to prevent the moil 120 from being ejected in the event of a dry fire, and the second being to prevent the moil 120 from striking the internal elements of the tool in the event of a recoil blow. These scenarios induce high magnitude shock waves through the tool and all critical components, potentially causing failure.

In conventional linerbolt removal tools, the cross pins are horizontally orientated and are normally retained with lynch pins which are susceptible to failure. However, the arrangement shown in FIGS. 4A and 4B addresses this issue by isolating the cross pins 420 from the housing 110 of the linerbolt removal tool 100 by introducing elastomer bushes 430, 440.

A number of preferred or optional features of this aspect will now be described.

In the particular embodiment shown in FIGS. 4A and 4B, the cross pin bushes 430, 440 are located in the front portion (also referred to as the nose) of the housing 110. As shown in FIG. 4B, each cross pin 420 may be mounted in a pair of bushes 430, 440. In some examples, the two bushes 430, 440 in the pair may have different configurations depending on their location. In this example, each bush 430, 440 may include a flange that engages with a radial recess groove 112 in the housing 110 for retaining the bush 430, 440 in the housing 110. Thus, the bushes 430, 440 may be held in place using radial recess grooves 112. When the cross pins 420 are installed the bushes 430 and 440 are fully locked in position between the cross pins 420, the radial recess grooves 112 and the nose of the housing 110.

It is noted that, in this new configuration, the cross pins 420 are less restrained from movement when impacted, which amplifies the retention issues associated with the current design. However, to overcome this issue, the cross pins 420 and bushes 430, 440 may be orientated vertically to allow the cross pins 420 to be held in by gravity (in contrast to conventional cross pins which are oriented horizontally. The cross pins 420 may be restrained from falling through by a step 421 at a bottom of each cross pin 420, which engages with a corresponding shoulder in a respective lower one of the bushes 440, to thereby restrain the cross pin 420 within the bush 440.

As shown in FIG. 1, the moil 120 may include at least one supporting surface 123 for supporting the moil 120 within the receptacle 111, and at least one engaging surface 124 for engaging with the cross pins 420. The engaging surface 124 is normally recessed relative to the at least one supporting surface 124. Typically, the at least one supporting surface 123 is substantially cylindrical, and the at least one engaging surface 124 may be provided in the form of a groove defined around a circumference of the moil 120. However, it will be appreciated that the above described arrangement involving mounting the cross pins 420 in resilient bushes 430, 440 may be implement with other moil 120 configurations.

As mentioned above, in a dry-fire scenario, the moil 120 may not actually strike the linerbolt or the linerbolt may be easily removed whilst offering little resistance to the impact. If this occurs, the motion of the moil 120 within the receptacle 111 along the hammer axis 101 will continue unarrested by the linerbolt, until engaging surface 124 of the moil 120 engages with the cross pins 420. If such a dry-fire scenario occurs during the use of conventional cross pins, extreme shock loading will be encountered as the moil 120 is suddenly stopped by the cross pins. On the other band, since the cross pins 420 are mounted in bushes 430 formed from resilient material, the shock loading will be partially attenuated by the resilient interface. Accordingly, it will be appreciated that the configuration of the cross pins 420 and resilient bushes 430, 440 will help to reduce the risk of damage or reduction of operational life in the linerbolt removal tool 100 due to a dry-fire scenario or similar events.

For the sake of completeness, a number of other practical implementation features of embodiments of the linerbolt removal tool 100 incorporating one or more of the above discussed aspects will now be described.

The accumulator 140 may be formed as a substantially blind axial cylinder extending from the inertial body 130. The accumulator 140 may be charged for firing by hydraulically driving the piston 160 to its retracted position. The accumulator 140 may be fired by quick release of the hydraulic fluid utilized to drive the piston 160 to its retracted position. The quick release may be provided by controlling the outflow of the hydraulic fluid utilized to drive the piston 160 to its retracted position through cascade connected logic elements. The accumulator 140 may be gas charged external of the housing via a suitably valved charging tube to the inertial body 130 including a flexible tube section 141 to accommodate movement of the inertial body 130.

The piston 160 typically slides in a cylinder formed in the inertial body 112. The impact collar 150 may be mounted rearwardly of the cylinder and may be installed together with a sealing arrangement for preventing the escape of gas from the accumulator 140 into the cylinder during movement of the piston 160.

As mentioned above, the inertial body 130 may be moveable within the housing 110 along the hammer axis 101, whereby firing the piston 160 from its retracted position to its striking position includes causing pressurized gas within the accumulator 140 to accelerate the piston 160 in the forward direction toward the moil 120 while the inertial body 130 accelerates in the rearward direction.

The linerbolt removal tool 100 may include a hydraulic ram assembly 180 for moving the inertial body 130 in the forward direction toward the moil 120 prior to firing the piston 160 whereby the inertial body 130 is accelerated in the rearward direction and subsequently decelerated to substantially absorb a reaction generated by firing the piston 160. The hydraulic ram assembly 180 may also be for moving the inertial body 130 in the rearward direction away from moil 120 subsequent to firing the piston 160.

The hydraulic ram assembly 180 may include a plurality of fluid inlet ports which are sequentially opened to a working chamber of the hydraulic ram assembly 180 as the length of the working chamber extends. The hydraulic ram assembly 180 may be in the form of a double acting ram assembly having a working chamber which converts to a drain chamber upon reverse operation of the hydraulic ram assembly and wherein the plurality of fluid inlet ports become drain ports which are sequentially closed during contraction of the drain chamber.

The inertial body 130 is typically constrained to move along one or more guides associated with the housing 110. In particular, the inertial body 130 may be supported on linear bearings on a pair of spaced parallel bars which extend parallel to the hammer axis.

As mentioned above, the construction and functionality of the improved embodiments of the linerbolt removal tool 100 may be based on embodiments of the conventional linerbolt removal tools as disclosed in the above discussed International Patent Application Publication Nos. WO1997026116 and WO2002081152, which disclose further details of other construction features that are not directly associated with the improved aspects of the linerbolt removal tool described herein.

It should be appreciated that the above described linerbolt removal tool improvements may be incorporated with the previously developed examples of linerbolt removal tool, and more than one of the improvements may be incorporated in combination where these are compatible with one another.

It should also be appreciated that the different embodiments of the linerbolt removal tools described herein may be modified to include any one or more of the improvements as described above, in order to enable the described functionalities of the linerbolt removal tool improvements.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

The invention claimed is:

1. A linerbolt removal tool, including:

a) a housing;

b) a moil supported for reciprocating movement along a hammer axis by a receptacle in the housing;

c) an inertial body located within the housing;

d) a gas charged accumulator extending from the inertial body in a rearward direction away from the moil;

e) a piston moveable within the inertial body along the hammer axis between a striking position at which the piston strikes the moil and a retracted position remote from the moil at which a rear portion of the piston is retracted within the accumulator, whereby firing the piston from its retracted position to its striking position includes causing pressurised gas within the accumulator to accelerate the piston in a forward direction toward the moil, and f) cross pins traversing the receptacle for limiting movement of the moil, wherein when the moil impacts a linerbolt that is unable to absorb the striking energy imparted to the moil, forward movement of the moil is stopped by the cross pins, and wherein the cross pins are mounted in bushes formed from a resilient material.

2. A linerbolt removal tool according to claim 1, wherein the resilient material is an elastomer.

3. A linerbolt removal tool according to claim 1, wherein the cross pins are isolated from the housing using the bushes.

4. A linerbolt removal tool according to claim 1, wherein each cross pin is mounted in a pair of bushes.

5. A linerbolt removal tool according to claim 1, wherein each bush includes a flange that engages with a radial recess groove in the housing for retaining the bush in the housing.

6. A linerbolt removal tool according to claim 1, wherein the cross pins and bushes are oriented vertically.

7. A linerbolt removal tool according to claim 6, wherein each cross pin includes a step at a bottom end thereof which engages with a corresponding shoulder in a respective lower one of the bushes to thereby restrain the cross pin within the bush.

8. A linerbolt removal tool according to claim 1, wherein the moil includes:

a) at least one supporting surface for supporting the moil within the receptacle; and b) at least one engaging surface for engaging with the cross pins, wherein the engaging surface is recessed relative to the at least one supporting surface.

9. A linerbolt removal tool according to claim 8, wherein:

a) the at least one supporting surface is substantially cylindrical; and b) the at least one engaging surface is a groove defined around a circumference of the moil.

10. A linerbolt removal tool according to claim 1, wherein the accumulator is formed as a substantially blind axial cylinder extending from the inertial body.

11. A linerbolt removal tool according to claim 10, wherein:

the accumulator is charged for firing by hydraulically driving the piston to its retracted position;

the accumulator is fired by quick release of the hydraulic fluid utilised to drive the piston to its retracted position; and the quick release is provided by controlling the outflow of the hydraulic fluid utilised to drive the piston to its retracted position through cascade connected logic elements.

12. A linerbolt removal tool according to claim 1, wherein the accumulator is gas charged external of the housing via a suitably valved charging tube to the inertial body including a flexible tube section to accommodate movement of the inertial body.

13. A linerbolt removal tool according to claim 1, wherein the piston slides in a cylinder formed in the inertial body.

14. A linerbolt removal tool according to claim 1, wherein the inertial body is moveable within the housing along the hammer axis, whereby firing the piston from its retracted position to its striking position includes causing pressurised gas within the accumulator to accelerate the piston in the forward direction toward the moil while the inertial body accelerates in the rearward direction.

15. A linerbolt removal tool according to claim 1, wherein the linerbolt removal tool includes a hydraulic ram assembly for moving the inertial body in the forward direction toward the moil prior to firing the piston whereby the inertial body is accelerated in the rearward direction and subsequently decelerated to substantially absorb a reaction generated by firing the piston.

16. A linerbolt removal tool according to claim 15, wherein the hydraulic ram assembly is also for moving the inertial body in the rearward direction away from moil subsequent to firing the piston.

17. A linerbolt removal tool according to claim 15, wherein the hydraulic ram assembly includes a plurality of fluid inlet ports which are sequentially opened to a working chamber of the hydraulic ram assembly as the length of the working chamber extends.

18. A linerbolt removal tool according to claim 17, wherein the hydraulic ram assembly is a double acting ram assembly having a working chamber which converts to a drain chamber upon reverse operation of the hydraulic ram assembly and wherein the plurality of fluid inlet ports become drain ports which are sequentially closed during contraction of the drain chamber.

19. A linerbolt removal tool according to claim 1, wherein the inertial body is constrained to move along one or more guides associated with the housing.

20. A linerbolt removal tool according to claim 19, wherein the inertial body is supported on linear bearings on a pair of spaced parallel bars which extend parallel to the hammer axis.

* * * * *